United States Patent
Palomo et al.

(10) Patent No.: US 10,963,696 B2
(45) Date of Patent: Mar. 30, 2021

(54) VISUAL MENU

(71) Applicant: Google LLC, Mountain View, CA (US)

(72) Inventors: Cesar Morais Palomo, Zurich (CH); Haroon Baig, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/470,682

(22) PCT Filed: Jul. 9, 2018

(86) PCT No.: PCT/US2018/041247
§ 371 (c)(1),
(2) Date: Jun. 18, 2019

(87) PCT Pub. No.: WO2020/013802
PCT Pub. Date: Jan. 16, 2020

(65) Prior Publication Data
US 2020/0234045 A1 Jul. 23, 2020

(51) Int. Cl.
| | | |
|---|---|---|
| *G09G 5/00* | (2006.01) |
| *G06K 9/00* | (2006.01) |
| *G06F 16/583* | (2019.01) |
| *G06F 16/2457* | (2019.01) |
| *G06F 40/205* | (2020.01) |
| *G06K 9/62* | (2006.01) |
| *G06T 19/00* | (2011.01) |

(52) U.S. Cl.
CPC ... *G06K 9/00671* (2013.01); *G06F 16/24578* (2019.01); *G06F 16/5846* (2019.01); *G06F 40/205* (2020.01); *G06K 9/6262* (2013.01); *G06T 19/006* (2013.01); *G06K 2209/01* (2013.01)

(58) Field of Classification Search
CPC .............. G06F 16/5846; G06F 40/205; G06K 9/00671; G06T 19/006
See application file for complete search history.

(56) References Cited

U.S. PATENT DOCUMENTS

| | | |
|---|---|---|
| 8,681,178 B1 | 3/2014 | Tseng |
| 9,355,336 B1 | 5/2016 | Jahagirdar et al. |

(Continued)

FOREIGN PATENT DOCUMENTS

| | | |
|---|---|---|
| CN | 107609914 A | 1/2018 |
| WO | 2013033109 A2 | 3/2013 |

OTHER PUBLICATIONS

Beijbom et al., Menu-Match: Restaurant-Specific Food Logging from Images, Winter Conference on Applications of Computer Vision (WACV 2015), Jan. 2015, 8 pages.

(Continued)

*Primary Examiner* — Charles Tseng
(74) *Attorney, Agent, or Firm* — Lerner, David, Littenberg, Krumholz & Mentlik, LLP

(57) ABSTRACT

An augmented reality (AR) overlay augments traditional menu items with corresponding photos, thereby facilitating a decision-making process of a user ordering from the menu. In addition to providing imagery of the menu items listed, other information may also be supplied, such as ratings, reviews etc. In this regard, users can visualize what to expect before ordering, and can order with a greater degree of confidence that they will enjoy the menu item they select.

18 Claims, 8 Drawing Sheets

(56) References Cited

U.S. PATENT DOCUMENTS

| | | |
|---|---|---|
| 2011/0221659 A1 | 9/2011 | King, III et al. |
| 2013/0061148 A1* | 3/2013 | Das .................. G06K 9/3258 |
| | | 715/738 |
| 2014/0147829 A1* | 5/2014 | Jerauld ................ G06T 19/006 |
| | | 434/430 |
| 2014/0250110 A1 | 9/2014 | Yang et al. |
| 2015/0228062 A1 | 8/2015 | Joshi et al. |
| 2016/0070439 A1 | 3/2016 | Bostick et al. |

OTHER PUBLICATIONS

International Search Report and Written Opinion for PCT Application No. PCT/US2018/041247 dated Feb. 22, 2019. 15 pages.
Uricchio, Tiberio et al. "Automatic image annotation via label transfer in the semantic space." Pattern Recognition, vol. 71. May 26, 2017 (May 26, 2017), pp. 144-157, XP085129162, ISSN: 0031-3203, DOI: 10.1016/J.PATCOG.2017.05.019.
International Preliminary Report on Patentability for PCT Application No. PCT/US2018/041247 dated Jan. 21, 2021. 8 pages.

* cited by examiner

VISUAL MENU

CROSS-REFERENCE TO RELATED APPLICATION

This application is a national phase entry under 35 U.S.C. § 371 of International Application No. PCT/US2018/041247, filed Jul. 9, 2018, the entire disclosure of which is incorporated herein by reference.

BACKGROUND

Ordering from a menu can be somewhat difficult, particularly in unfamiliar places. For example, when a user goes to a restaurant, some dishes on the menu may seem interesting, but the menu often does not provide enough information for the user to be sure that they would enjoy a certain dish. The uncertainty is often compounded when visiting restaurants for the first time, restaurants in different geographical locations, or restaurants serving a different type of cuisine than the user is accustomed.

Seeing what the dishes look like would help resolve the uncertainty and make the experience more enjoyable, but traditionally most restaurant menus only have names and/or descriptions of the dishes and no images. Users may look at images for the restaurant in local search applications, but it is cumbersome to manually match the images they see with the menu items they read on the restaurant menu.

BRIEF SUMMARY

According to the present disclosure, an augmented reality (AR) overlay augments traditional menu items with corresponding photos, thereby facilitating a decision-making process of a user ordering from the menu. In addition to providing imagery of the menu items listed, other information may also be supplied, such as ratings, reviews etc. In this regard, users can visualize what to expect before ordering, and can order with a greater degree of confidence that they will enjoy the menu item they select.

One aspect of the disclosure provides a method of identifying images corresponding to text items, the method including receiving, with one or more processors, an image of text from an image capture device, parsing, with the one or more processors, the text in the image, determining, with the one or more processors, a location of the image capture device, determining, with the one or more processors, a entity corresponding to the determined location, and identifying images corresponding to the parsed text and the entity. The method further includes selecting, with the one or more processors, at least one of the identified images, and providing the selected image for display as an augmented reality overlay in relation to the text. According to some examples, the selecting process includes generating a first set of labels for the captured image based on the parsed text, generating a second set of labels for the identified images corresponding to the parsed text and the entity, and comparing the first set of labels to the second set of labels. For example, comparing the first set of labels to the second set of labels may include determining a distance between the first set of labels and the second set of labels, and selecting the at one of the identified images may include identifying a shortest distance between the first set of labels and the second set of labels, and selecting the image corresponding to the shortest distance. According to some examples, the method may further include generating a score for each of the identified images, and ranking the identified images based on the scores. The score may be at least partially based on image quality and image aesthetics. Display of the selected images may be in a fixed portion of a screen of a user device, or the displayed images may be attached to the text. In one implementation, the text is a menu item, the entity is a restaurant, and the identified images are images of a dish served at the restaurant corresponding to the menu item.

Another aspect of the disclosure provides a system for identifying images corresponding to text items. The system includes one or more memories, and one or more processors in communication with the one or more memories. The one or more processors may reside in a client device, in a server, or in some combination thereof. The one or more processors are configured to receive an image of text from an image capture device, parse the text in the image, determine a location of the image capture device, determine a entity corresponding to the determined location, identify images corresponding to the parsed text and the entity, select at least one of the identified images, and provide the selected image for display as an augmented reality overlay in relation to the text. In selecting the at least one of the identified images the one or more processors may be further configured to generate a first set of labels for the captured image based on the parsed text, generate a second set of labels for the identified images corresponding to the parsed text and the entity, and compare the first set of labels to the second set of labels. Comparing the first set of labels to the second set of labels may include determining a distance between the first set of labels and the second set of labels. Selecting the at one of the identified images may include identifying a shortest distance between the first set of labels and the second set of labels, and selecting the image corresponding to the shortest distance. According to some examples, the one or more processors are further configured to generate a score for each of the identified images and rank the identified images based on the scores. The score may be at least partially based on image quality and image aesthetics.

Yet another aspect of the disclosure provides a non-transitory computer-readable medium storing instructions executable by one or more processors for performing a method of identifying images corresponding to text items, the method comprising receiving an image of text from an image capture device, parsing the text in the image, determining a location of the image capture device, determining a entity corresponding to the determined location, identifying images corresponding to the parsed text and the entity, selecting at least one of the identified images, and providing the selected image for display as an augmented reality overlay in relation to the text.

DETAILED DESCRIPTION

Figure 1:
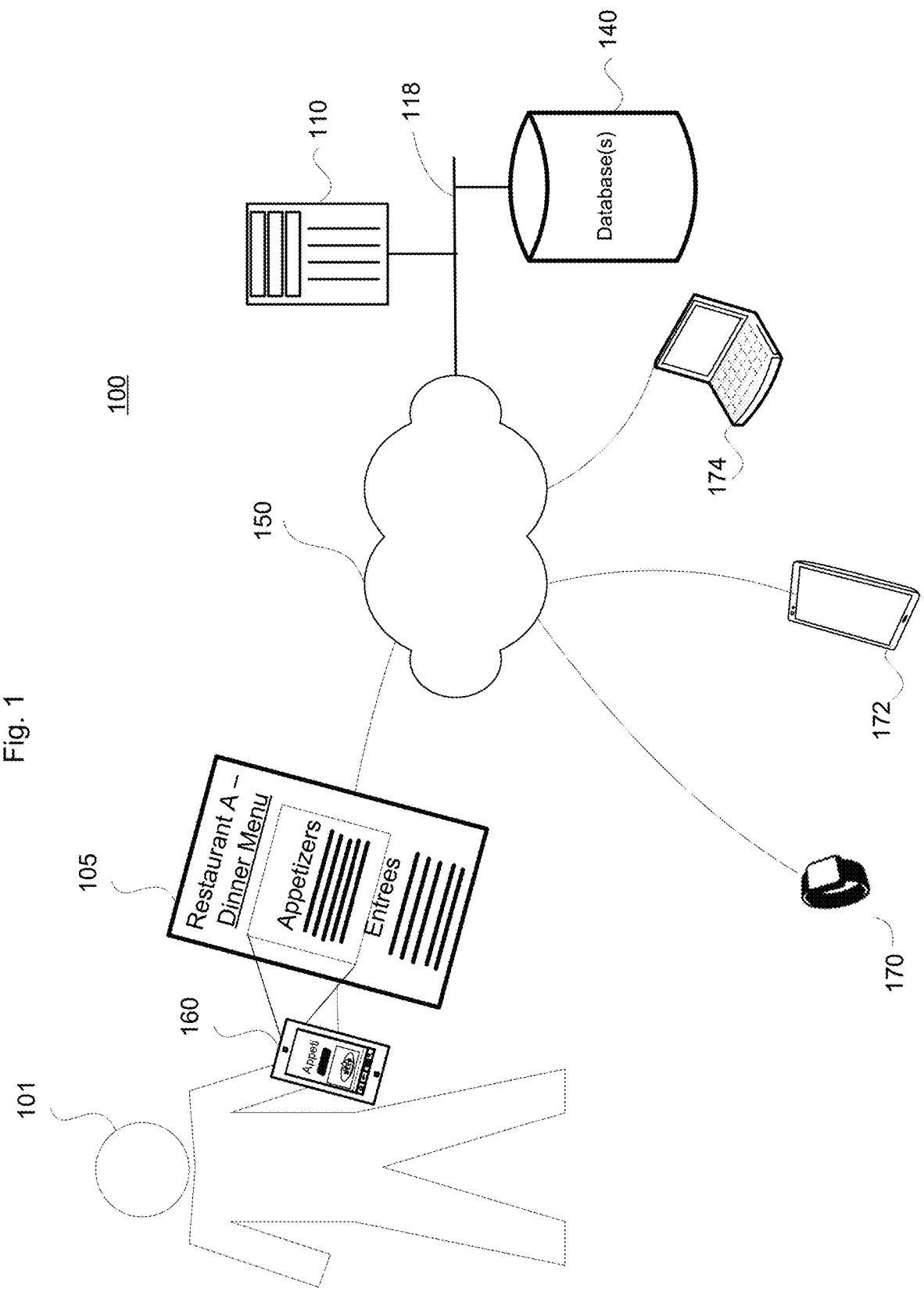
FIG. 1 is a pictorial diagram of an example system according to aspects of the disclosure.

Overview:

The present disclosure provides an augmented reality application, where text is captured and recognized by a mobile device, and corresponding images are retrieved and displayed in relation to the text as an augmented reality (AR) overlay. For example, the text may be a menu item at an eatery. Once the text is captured and recognized, images of the menu item may be retrieved from a network, such as the Internet, and displayed in relation to the menu text.

In some examples, location of the mobile device may be used to determine a narrower subset of corresponding images. For example, users may be "snapped" to a specific restaurant by determining a location of the mobile device and comparing the determined location to known restaurant locations. The location of the mobile device may be determined based on, for example, GPS, beacons, signal strength, semantic features such as light, noise, air pressure, etc., or any of a number of other features. By snapping to a particular location, a search for relevant images may be limited, thus making the search faster and more efficient. In other examples, the search may be limited based on user input, such as user entry of a restaurant name, image recognition, or the like. For example, an image of the restaurant menu may be recognized, such as by comparing a logo, parsing the restaurant name, comparing dish names against menu information on web pages associated with the restaurant, etc.

Text received through the camera input may be parsed, for example, using optical character recognition. While in some examples the text may be automatically parsed, and an image retrieved in response, in other examples operations may be prompted by user input. For example, the parsing of text and/or retrieval of images may be performed in response to a user command, such as tapping on an item, voice command, etc.

To generate a candidate set of potential imagery, images may be retrieved from various sources. For example, images may be retrieved from various websites, databases supporting websites and applications, a database of user-contributed images, etc. Images that are tagged with geographical information matching that of the user's location, or tagged with any other information corresponding to the user's location, may facilitate retrieval. Tags may be created for images that are not tagged. For example, image recognition may be used to create tags for images. In other examples, users may contribute information for captured images. Image labels are created for the candidate images, for example, based on the tags or other information.

A set of text labels may be created for the captured imagery. For example, for a menu item at a restaurant, the recognized text corresponding to the menu item may be annotated into labels for the menu item. In some examples, a plurality of text labels may be created for each captured image, such as Curry, Red Curry, Indian, etc. for a menu item.

To match the candidate images with the recognized text, the image labels may be compared with the text labels. For example, a Jaccard distance between the image labels and the text labels may be computed. As a result of the comparison, a confidence value for each candidate image is provided. The confidence value may be used to rank images that are likely to most closely correspond to the recognized text. According to some examples, other information may also be used to rank the candidate images. For example, factors such as image quality, diversity (e.g., different angles, proximities, etc.), or any other factors may be integrated into the confidence value. The candidate image having the highest confidence value may be selected for display in an AR overlay. While in some examples one image may be selected for each piece of text, such as each menu item, in other examples multiple images may be accessed by the user for each piece of text.

The overlay can be shown in any of a number of ways. For example, the overlay can be provided in a fixed space on a screen of the mobile device. In other examples, the overlay may be attached to the recognized text. For example, as a user scrolls through a menu, images retrieved for a particular menu item may appear as the mobile device captures the associated text. As the mobile device continues to move, and the particular menu item is no longer within field of view of the camera, the retrieved image may disappear and different images corresponding to different menu items that have come within the camera field of view may be displayed. In some examples, user input may be received by include scrolling through the retrieved images or other image manipulation, such as zooming, panning, etc. on a particular image.

Example Systems

FIG. 1 illustrates an example system 100 including computing devices for performing aspects of the present disclosure. The system 100 includes various client computing devices 160, 170-174 communicatively coupled to a server computing device 110 through a network 150. User 101 uses computing device 160 to capture text, such as from a menu 105. The server computing device 110 may identify images corresponding to the captured text, and provide such images for display on the computing device 160. The computing device 160 may display the images as, for example, an augmented reality overlay is relation to the captured text.

The client computing devices 160, 170-174 may include any of a variety of types of devices capable of capturing images and communicating over a network. By way of example and not limitation, such devices may include smart phones, cameras with wireless network access, laptops, smartwatches, tablets, head-mounted displays, gaming systems, etc. Each client computing device may include, for example, user input devices such as cameras, microphones, joysticks, buttons, touch screens, etc., as well as a display, which could include, for instance, an LED, LCD, plasma screen, projector, etc.

The server computing device 110 may actually include a plurality of processing devices in communication with one another. The server computing device 110 is described in further detail in connection with FIG. 2 below.

Databases 140 may be accessible by the server 110 and client computing devices 160, 170-174. The databases 140 may include, for example, a collection of imagery from various sources. For example, the imagery may be provided by entity owners or customers, collected from various websites, etc. The entity may be a business such as an eatery. Such imagery may in some instances be stored with metadata providing information regarding the images. Such metadata may include, for example, date and time of capture, location, camera settings, labels or tags corresponding to objects within the images, etc. The images may include, for example, still images, video clips, or other types of imagery.

These network 150 may be, for example, a LAN, WAN, the Internet, etc. The connections between devices and the network may be wired or wireless.

While in this example, and in other examples throughout the disclosure, the text captured by the client device 160 corresponds to menu items at a restaurant, it should be understood that the capturing of text and providing of images may be applied in any of a variety of other contexts, such as anything with a textual description of items that can be better explained if associated with an AR overlay of the visual item. For example, the text may be furniture assembly instructions, such as "insert screw type 1 into wooden plate C." Such text may be recognized and used to retrieve a visual item overlay, such as showing the overlay with an image of the screw type 1 next to "screw type 1" text, an image of the wooden plate C next to the "wooden plate C" text, and/or an image or video clip of the screw being inserted into the wooden plate.

Figure 2:
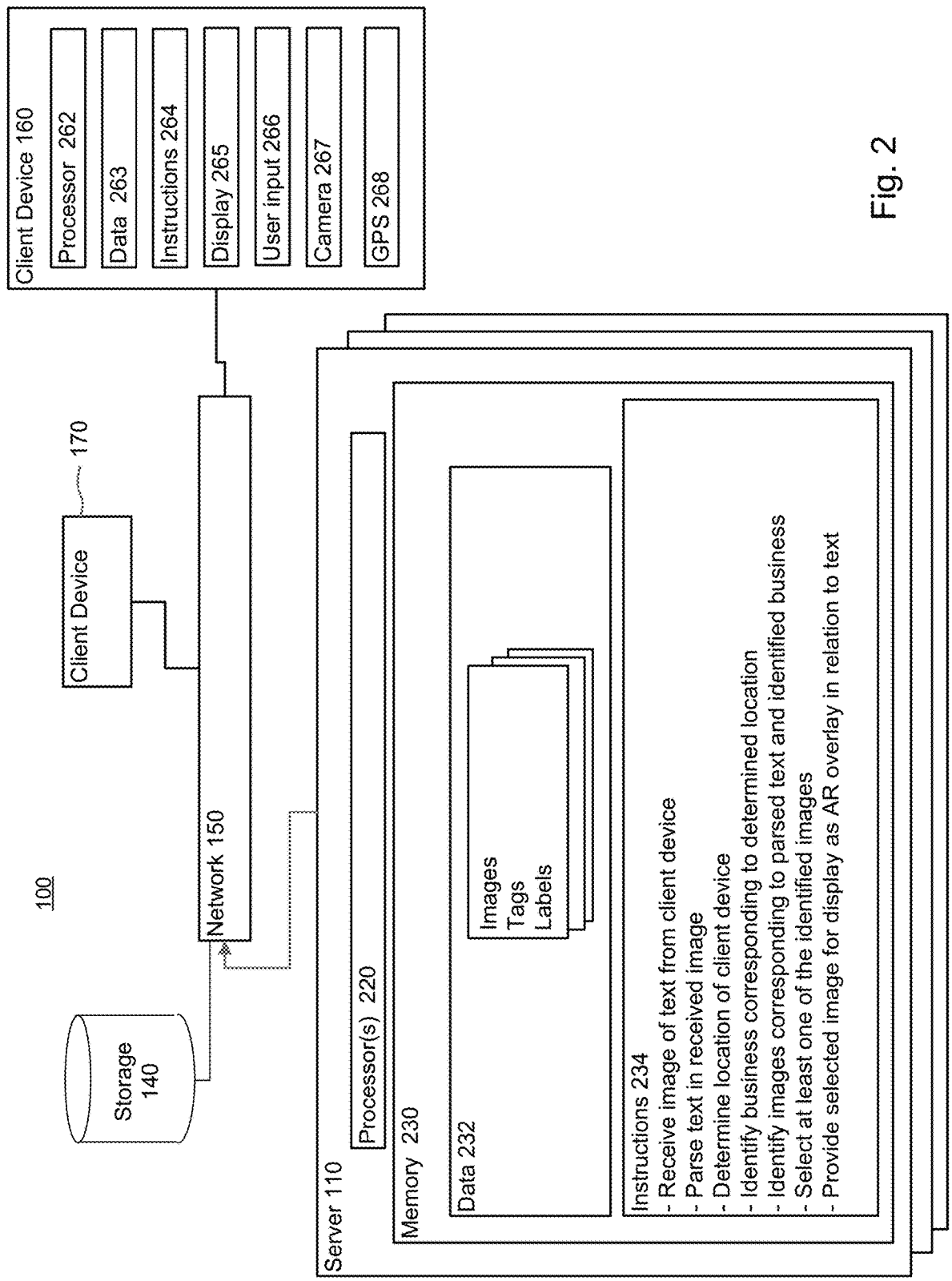
FIG. 2 is a block diagram of the example system of FIG. 1.

FIG. 2 illustrates further details of components in the example system 100. It should not be considered as limiting the scope of the disclosure or usefulness of the features described herein. Each of the server computing devices 110 can contain one or more processors 220, memory 230 and other components typically present in general purpose computing devices. Memory 230 of each computing device 110 can store information accessible by the one or more processors 220, including instructions 234 that can be executed by the one or more processors 220.

Memory 230 can also include data 232 that can be retrieved, manipulated or stored by the processor. The memory can be of any non-transitory type capable of storing information accessible by the processor, such as a harddrive, memory card, ROM, RAM, DVD, CD-ROM, writecapable, and read-only memories.

The instructions 234 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 232 may be retrieved, stored or modified by the one or more processors 220 in accordance with the instructions 234. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 220 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as image matching, image editing, object recognition, or performing other processes faster or more efficiently.

Although FIG. 2 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 160, 170 can be at different nodes of a network 150 and capable of directly and indirectly communicating with other nodes of network 150. Although only a few computing devices are depicted in FIG. 2, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 140 as well as computing devices 160, 170 via the network 150. For example, one or more of server computing devices 110 may use network 150 to transmit and present information to a user on a display, such as display 265 of computing device 160. In this regard, computing devices 160, 170 may be considered client computing devices and may perform all or some of the features described herein.

Each of the client computing devices 160, 170 may be configured similarly to the server computing devices 110, with one or more processors, memory and instructions as described above. Each client computing device 160, 170 may be a personal computing device intended for use by a user, and have all of the components normally used in connection with a personal computing device such as a processor 262, memory (e.g., RAM and internal hard drives) storing data 263 and instructions 264, a display 265, and user input 266. The client computing device may also include a camera 267 for recording video streams and/or capturing images, speakers, a network interface device, and all of the components used for connecting these elements to one another. The client computing device 160 may also include a location determination system, such as a GPS 268. Other examples of location determination systems may determine location based on wireless access signal strength, images of geographic objects such as landmarks, semantic indicators such as light or noise level, etc.

Although the client computing devices 160, 170 may each comprise a full-sized personal computing device, they may alternatively comprise mobile computing devices capable of wirelessly exchanging data with a server over a network such as the Internet. By way of example only, client computing device 160 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen.

As with memory 230, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110.

Storage system 140 may store data, such images corresponding to particular entities. For example, the images may depict menu items at particular restaurants. The images may be tagged with metadata providing various additional information. Such information may relate to, for example, a source of the images, content of the images, quality of the images, etc.

The one or more processors 220 may receive an image including text from one of the client devices, and parse the text, such as by using optical character recognition or other text recognition or analysis tools. The processors 220 may further determine a location of the client device sending the text image, and determine a entity corresponding to that location. For example, the processors 220 may determine that the text image is sent from a location corresponding to a particular restaurant. Such location information may help to limit a search for images of objects corresponding to the text, thereby making a process of searching for and identifying matching images of objects more efficient. Once images corresponding to the text and location are identified, one or more of those images may be selected. For example, the images may be ranked based on how closely the objects they depict match the parsed text, based on image quality, or based on any combination of these or other factors. The selected images are then provided for display on the client device as an augmented reality overlay.

Figure 3:
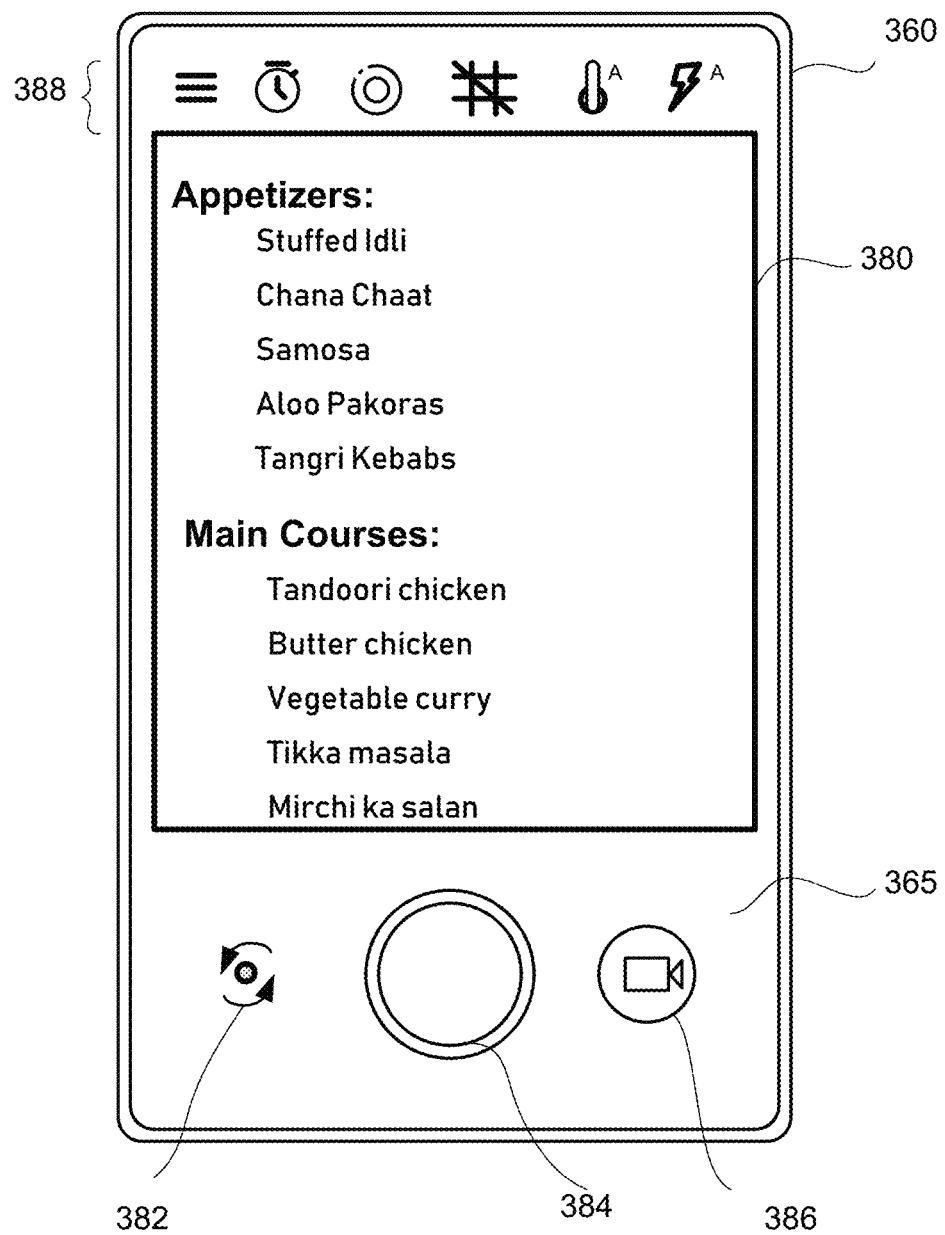
FIG. 3 is a screenshot of an example captured image of text according to aspects of the disclosure.
Figure 4:
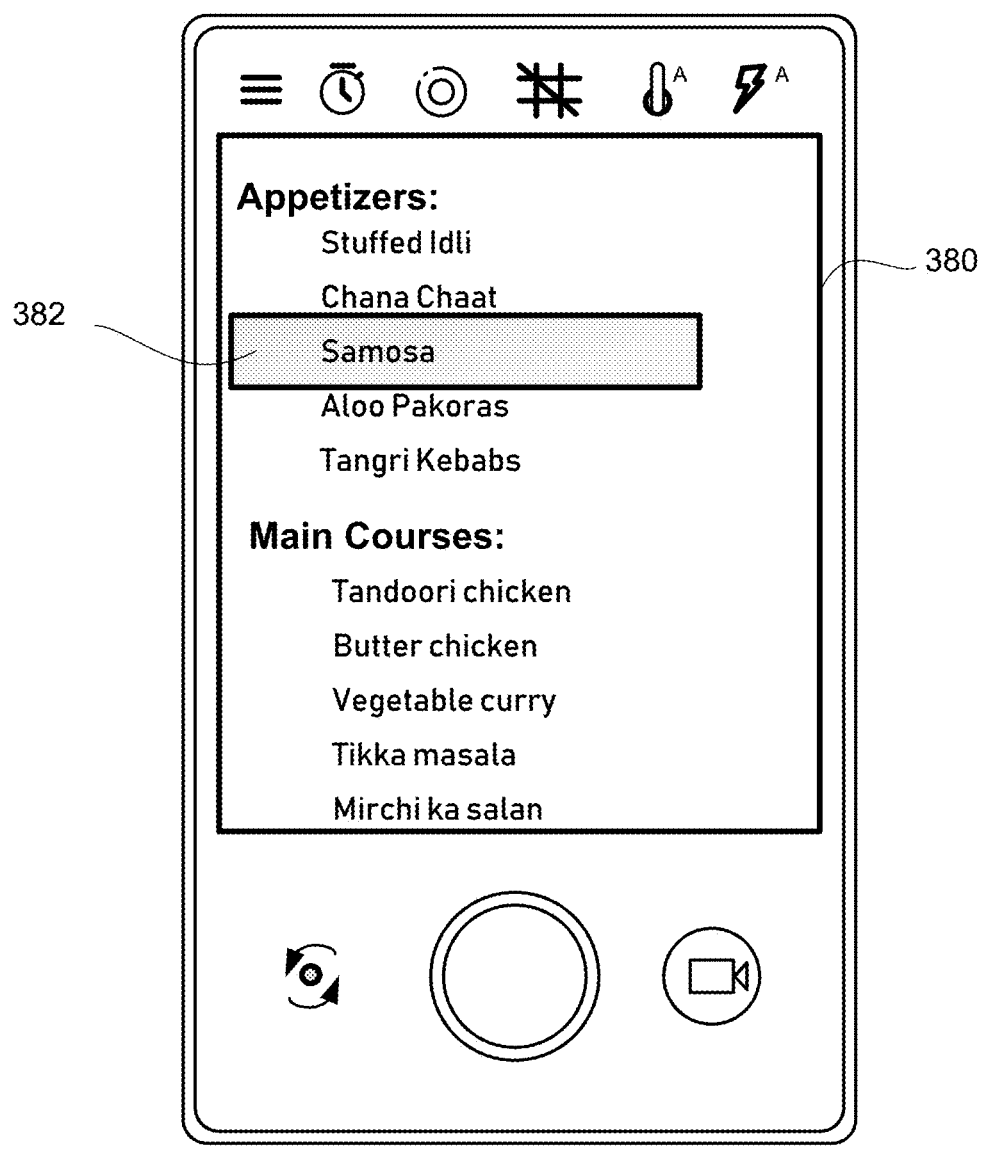
FIG. 4 is a screenshot of an example of selecting a portion of text within the image of FIG. 3.
Figure 5:
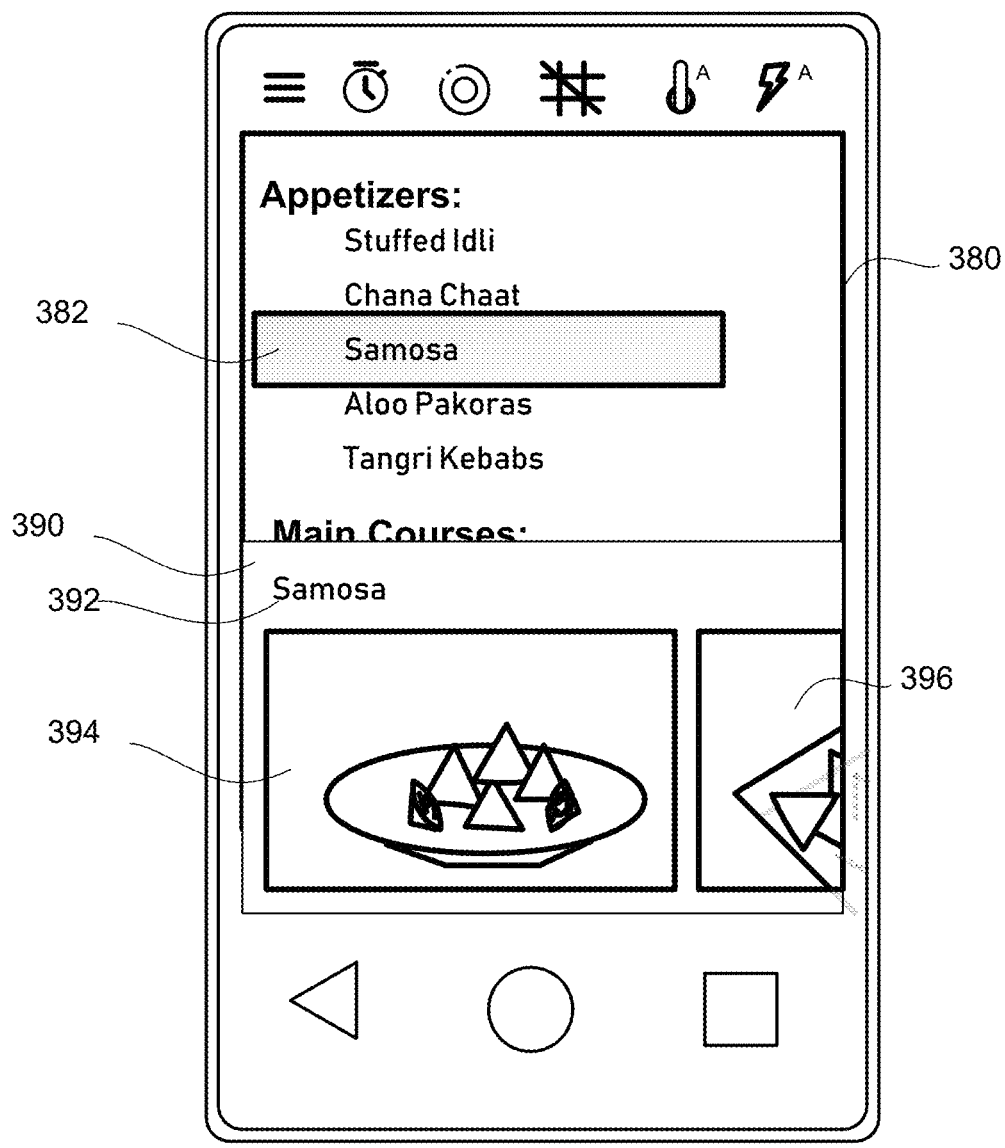
FIG. 5 is a screenshot of an example augmented reality overlay provided in response to the selected portion of text of FIG. 4.

FIGS. 3-5 illustrate an example of a client device 360 capturing a first image of text, selecting particular text, and displaying second images corresponding to the text as an augmented reality overlay. As shown in FIG. 3, client device 360 includes a display portion 365, such as a touch screen display. The display portion 365 displays a viewing pane 380, as well as a plurality of controls 382-388. The controls may be used to, for example, capture images, manipulate captured images, communicate with other devices, etc. Captured images may be visible within the viewing pane 380. In some examples, the client device 360 may continually capture images, such as by keeping a camera application open or recording video or the like. In this example, the viewing pane 380 shows a portion of a menu listing various menu selections.

As shown in FIG. 4, a portion 380 of the text may be selected by a user. For example, the portion 382 of selected text may correspond to an item on the menu of which the user would like to see a photo. The text may be selected by, for example, tapping a corresponding portion of the screen, drawing a window around the text using a touchscreen or controls, speaking the text into a microphone, or any of a number of other options. The user may transmit the portion 382 of text with a request to the server for a corresponding image. For example, the request may be sent automatically upon selection of the text, or the user may select a particular control option after selecting the text. In some examples, any text captured in the viewing pane 380 may automatically trigger retrieval of corresponding imagery.

As shown in FIG. 5, an overlay 390 is provided in response to the request. In this example, the overlay 390 includes information such as the text 392 that was searched and that corresponds to images 394, 396. In some examples, the portion 382 of selected text may include a plurality of words or phrases, such as a description of the menu item. In such cases, all of the text may be searched individually and as ordered combinations. Thus, various different results may be displayed that the user can scroll, swipe, or otherwise sort through. The text 392 in the overlay 390 may thus provide an indication to the user of which text in the selection portion 382 the images 394, 396 correspond to. Though not shown, other information may also be provided in the overlay 390. For example, such other information may include ratings, reviews, descriptions of the images, image metadata, etc.

While FIG. 5 shows the corresponding second images 394, 396 as an augmented reality overlay at a bottom of the viewing pane 380, it should be understood that the images may alternatively be presented in another format. For example, the images may be presented alongside the text, or on top of the text. In some examples, such as where the selected text portion 382 and the corresponding images 394, 396 are layered over one another, a top layer may be partially transparent so that the underlying layer is still visible. These are merely a few examples of numerous possible display formats.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
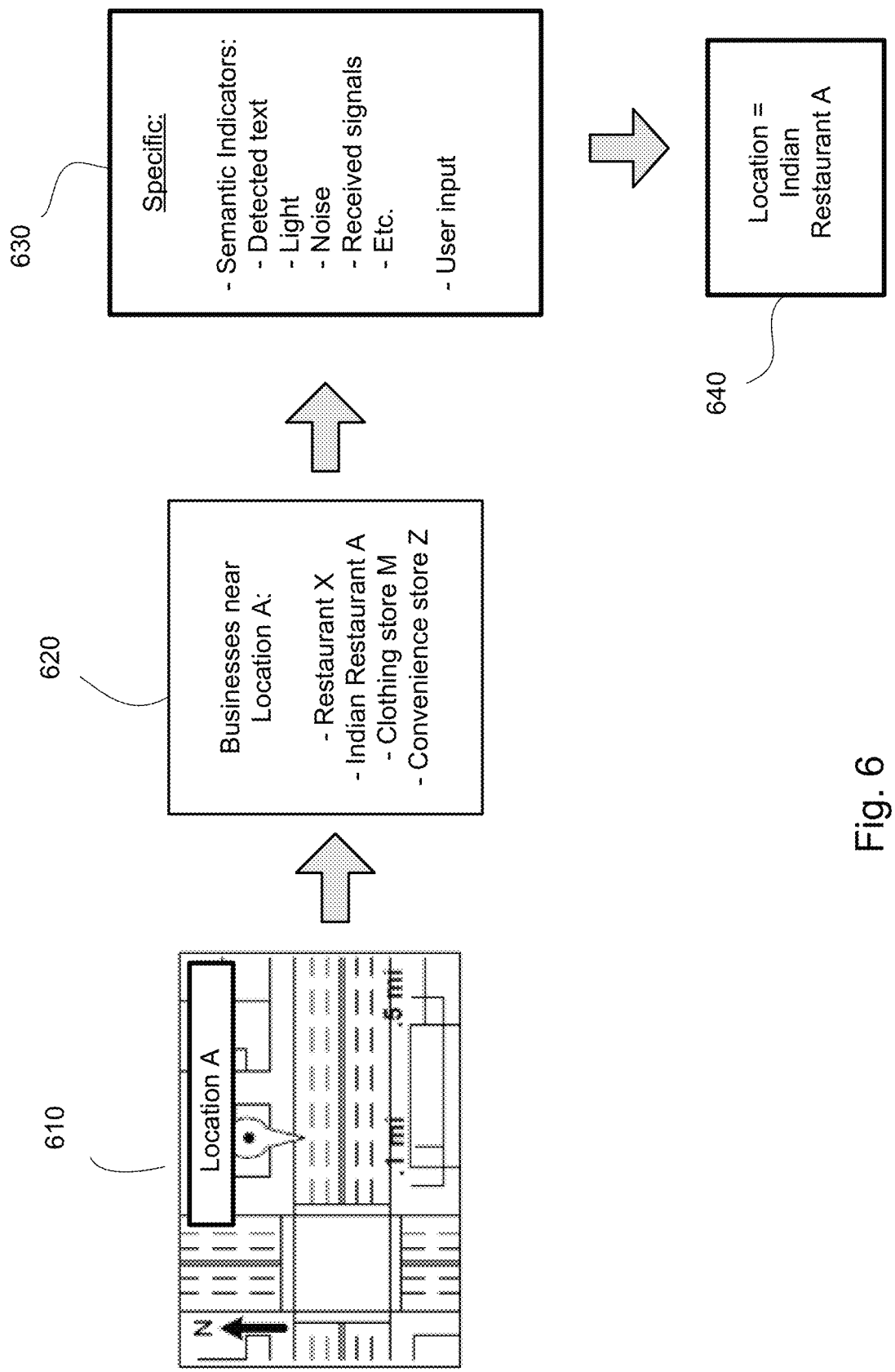
FIG. 6 is an example flow diagram illustrating location determination according to aspects of the disclosure.
Figure 7:
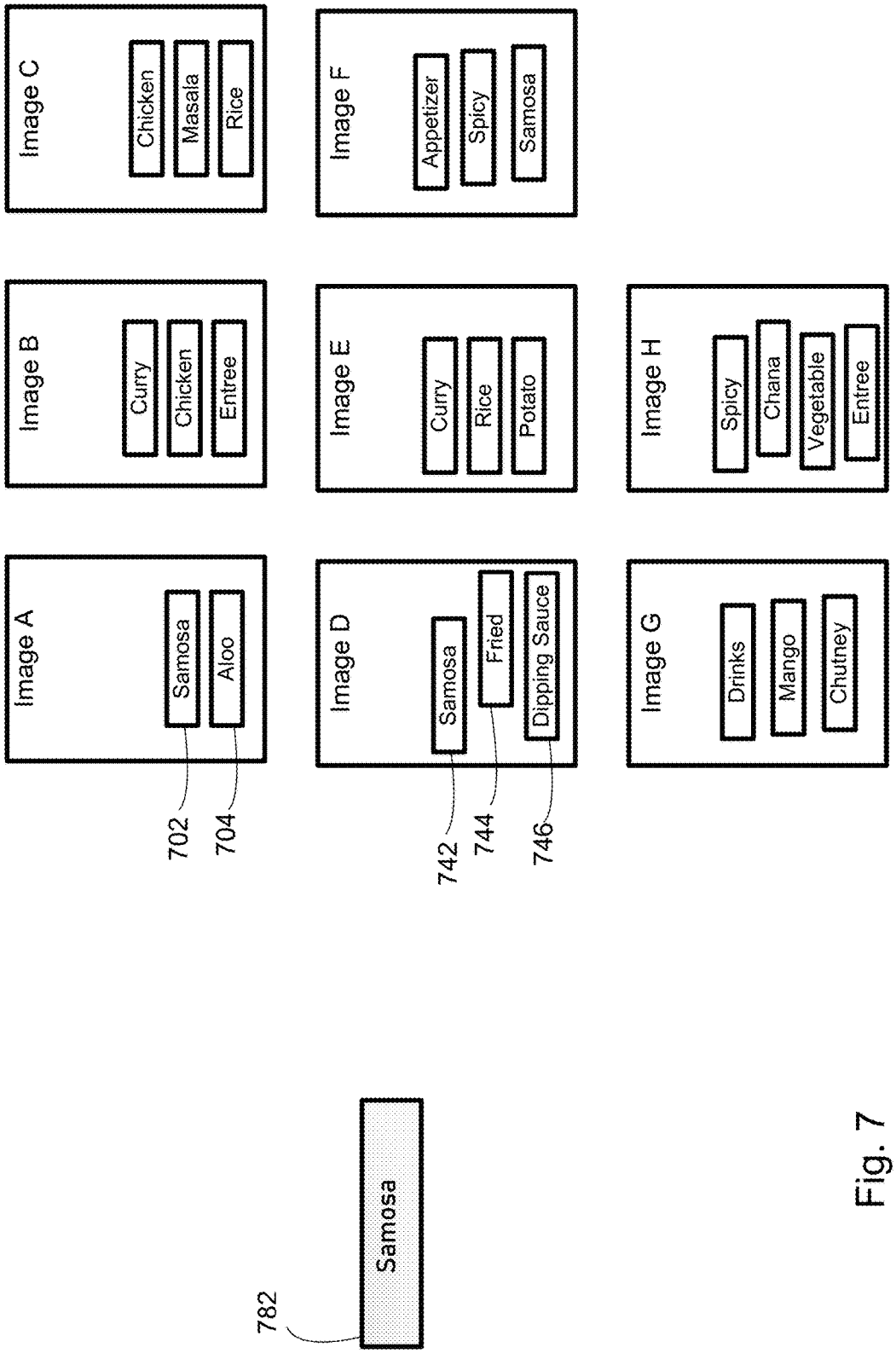
FIG. 7 illustrates an example of label matching according to aspects of the disclosure.

FIGS. 6-7 relate to a process of identifying imagery corresponding to the selected text. In particular, a candidate set of corresponding imagery may be narrowed by searching for images corresponding to a particular location. For example, where the image of the text is captured at a restaurant, the candidate images may be limited to images corresponding to that restaurant. Accordingly, a location of the client device may be determined based on any one or more of various indicators, such as GPS coordinates, user input, received signals (e.g., access point identifiers, received signal strength indicators, beacons, etc.), detected text, detected conditions (e.g., light, noise, air pressure, etc.). FIG. 6 provides just one possible example of determining the user/device location to narrow the subset of images. To protect user privacy, such location determination is only performed when authorized by the user, such as when a location sharing option on a mobile device is enabled.

As shown in FIG. 6, a geographic location 610 of the user may be initially determined, such as by using GPS location services. While the geographic location 610 is illustrated in FIG. 6 as a map view, it may be represented in any of a number of other forms, such as coordinates. In some instances, a number of entities may be located at or near a given geographic location, and as such, it is useful to further limit the image search to a particular entity at the geographic location. For example, in a crowded city neighborhood, multiple shops, cafes, restaurants, and other establishments may be located at or near a given location. In some examples, such locations 620 may be identified, and other specific information 630 may be used to determine which of the entities the user is at. The other specific information 630 may include various types of information, such as semantic information, user input, etc. The semantic information may include, for example, conditions surrounding the client device, such as light, noise, air pressure, temperature, movement, signal strength, etc. The semantic information may additionally or alternatively include text detected by the client device, such as a name of a restaurant at a top of the menu. The user input may include, for example, a confirmation in response to a prompt asking whether the user is at a particular location, a selection from a menu of the possible locations 620, text or voice entry, etc. The entity 640 at which the user is located may be determined based on any combination of such detected or manually entered information. In this example, having determined that the user is at Indian Restaurant A, a field of search for images corresponding to detected text may be limited to images linked to Indian Restaurant A. For example, the images may be collected from sites associated with Indian Restaurant A, such as the entity's website, user review sites, etc., the images may be tagged with information associated with Indian Restaurant A, or the images may in some other way be associated with Indian Restaurant A.

One or more particular images may be selected from the candidate set for providing to the client device for display. To select the most pertinent images quickly and efficiently, a label creation and matching process may be used. For example, as shown in FIG. 7, a first set of labels may be generated based on text captured by the client device, such as the text is portion 382 of FIG. 4. For example, the selected text may be annotated into a set of one or more camera labels. Following that example, a first label 782 is created for the selected text "samosa." In examples where the selected text included additional words, additional labels with the additional words, such as individually and in combinations, may also be generated.

A second set of labels is generated for a plurality of candidate images potentially matching the selected text. For example, the candidate images may include images identified as corresponding to the entity at which the user captured the text. According to some examples, candidate sets of imagery for particular entities may be generated and stored in a database prior to request from a user, such that the candidate set is available and accessible when the user request is received. For example, for a particular entity, such as Indian Restaurant A, images associated with the particular entity may be collected from various sources, such as maps databases, websites, geotagged images matching the location of the particular entity, images identified in a web search matching the name of the particular entity, names of items available at the particular entity, or other information related to the particular entity, or from any other source. In some examples, images may be contributed by users visiting the particular entity, and stored with the collected images in the candidate set. These pre-collected images may be labeled either prior to or after collection, or both. For example, user contributed images can be labeled with user-assigned tags and/or labels based on image recognition performed on the client device or on the server. Images collected from web sites and other sources may have tags or image captions or other metadata associated therewith, and may be assigned labels based on that metadata and/or image recognition. In some examples, a machine learning model may be used to generate the labels for the pre-collected candidate set of images. According to other examples, the candidate set of images may be collected in real time in response to a user request, and the images may be labeled as they are collected.

As shown in FIG. 7, candidate images A-H each include one or more image labels identifying objects in the image, collectively forming the second set of labels. For example, image A includes labels 702, 704, image D includes labels 742-746, etc. While the labels illustrated in FIG. 7 depict names of menu items and ingredients in the menu items, it should be understood that the labels may include other information. For example, the labels may include an identifier for the particular entity, other details relating to contents of the image, etc.

Using the first set of camera labels and the second set of image labels, matching may be performed to identify the images most closely matching the text received. For example, a distance, such as a Jaccard distance, between the first set of labels and the second set of labels may be computed. Such computation may result in a score or confidence value for each image, and the score/confidence value may be used to rank images more likely to depict the received text. In some instances, such as when a number of high-confidence matches are found, additional ranking signals may be used. Such additional ranking signals may include, by way of example only, attractiveness of the image, quality of the image, diversity, etc. For example, attractiveness may be determined based on how popular the image is based on ratings, number of comments, content of comments, etc., or by image sharpness, resolution, or other image characteristics. Diversity of the image may relate to different camera angles, views, proximity of the objects in the image to the view point, etc. The additional ranking signals may be factored into generation of the score or confidence value for each image. In other examples, the additional ranking signals maybe used to generate a second score, and the second score may be combined with the first score or may be used as an additional round of filtering. For example, the first score based on the computed distance between labels may be used to select a first set of images where the distance is below a predetermined threshold and to filter remaining images where the distance is above the threshold. The second score may be used to further limit the selected first set of images. For example, the second score may be used to rank the first set of images, and a predetermined number of the first set of images may be selected for display based on their rank.

Figure 8:
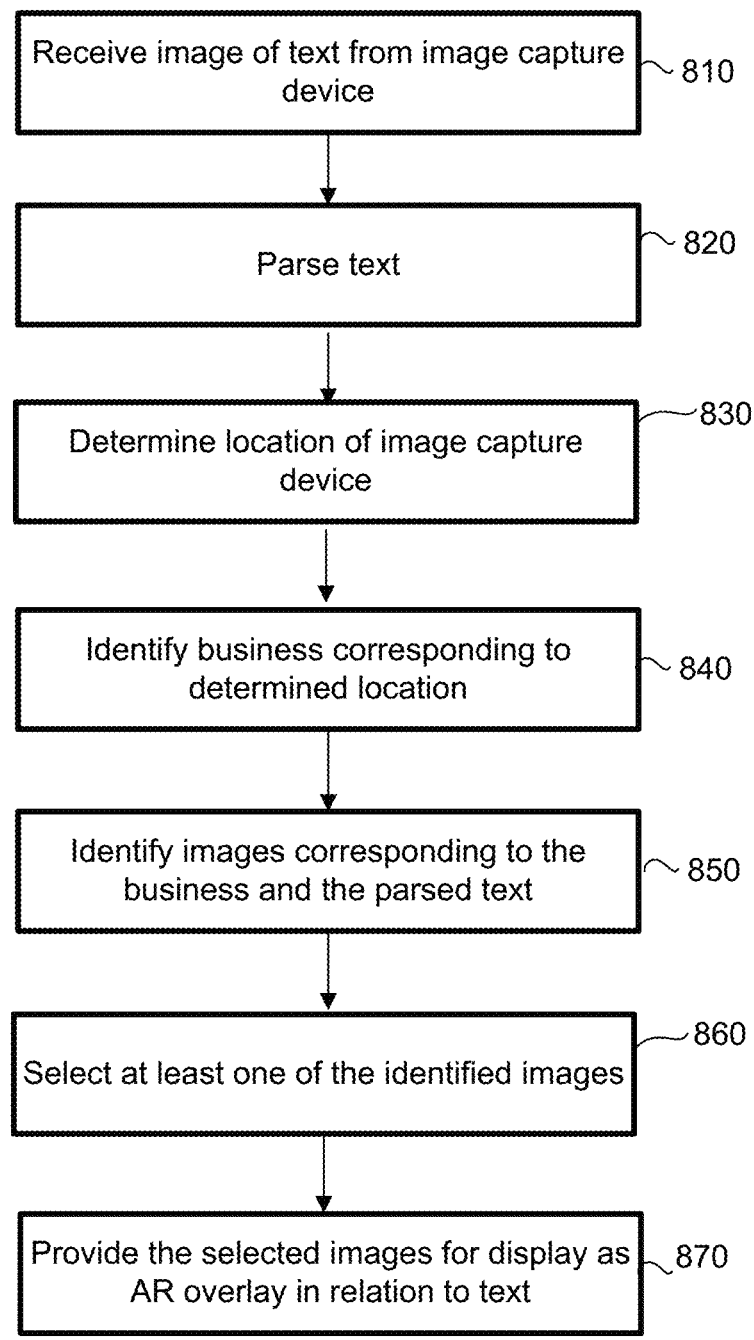
FIG. 8 is a flow diagram illustrating an example method according to aspects of the disclosure.

FIG. 8 illustrates an example method of providing images corresponding to detected text as an augmented reality overlay in relation to the text. The method may be performed locally on a client device, or remotely by one or more servers, or by some combination of such devices.

In block 810, an image of text is received from an image capture device. For example, the client device captures an image of text from a menu at a restaurant, and the user selects particular text for which images are requested. The selected particular text may correspond to one or more menu items, and may include accompanying descriptions of the menu items. Including the accompanying descriptions may increase a number of corresponding images that are identified or increase an accuracy of images ultimately selected for display. In block 820, the particular text selected in the captured image is parsed, such as by using text recognition tools.

In block 830, a location of the image capture device is determined. For example, the location may be determined using GPS, information from received signals, detected conditions, user input, etc. The determined location may be used to identify a particular entity at which the image was captured (block 840).

In block 850, candidate images are identified, the candidate images corresponding to the parsed text and the identified entity. The candidate images may be identified based on geo-tags, label-matching, machine learning, or any of a number of other techniques.

In block 860, one or more of the candidate images are selected for display on the client device. The images may be selected based on how closely labels associated with the images match labels generated for the text in the image captured by the client device. In some examples, the candidate images may be scored and ranked based on any of a variety of criteria, such as closeness of label matching, quality of images, angle of the images, sources of the images, etc.

In block 870, the selected images are provide for display on the client device as an augmented reality overlay in relation to the text. For example, the images may automatically be displayed in a portion of a screen of the client device below, next to, over, or elsewhere in relation to the text. In other examples, the images may be attached to the selected text. For example, as the selected text moves within a viewing pane, the corresponding images move along with it.

As the user continues to browse the menu or other source of the captured text, the user may continue to select text for retrieving corresponding imagery. For example, if the user slowly scans the menu with the device, images corresponding to text that enters a field of view may be retrieved and displayed. When such text exits the field of view, the corresponding images may be replaced with other images relating to new text that has come within the field of view.

The approach of the present disclosure can improve the efficiency of data processing by retrieving image data associated with text in a given environment. In particular, by utilising location data in retrieving image data, improved data recovery can be achieved without requiring additional user input. For example, disambiguation can be achieved in situations where a given text string may correspond to multiple images. By providing imagery in this manner, user may be quickly presented with additional information to facilitate their decision-making processes, without having to enter various search requests, look for particular websites, and sort through various irrelevant information. Accordingly, the user's experience is enhanced and more enjoyable.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of identifying images corresponding to text items, comprising:
   receiving, with one or more processors, captured image of captured text from an image capture device;
   parsing, with the one or more processors, the captured text in the captured image;
   determining, with the one or more processors, a location of the image capture device at a time the captured image was captured;
   determining, with the one or more processors, an entity corresponding to the determined location;
   identifying images corresponding to the parsed text and the entity;
   selecting at least one of the identified images by generating a first set of labels for the captured image based on the parsed text, generating a second set of labels for the identified images corresponding to the parsed text and the entity, and comparing the first set of labels to the second set of labels; and
   providing the selected image for display as an augmented reality overlay in relation to the captured text.

2. The method of claim 1, wherein comparing the first set of labels to the second set of labels comprises determining a distance between the first set of labels and the second set of labels.

3. The method of claim 2, wherein selecting the at least one of the identified images comprises identifying a shortest distance between the first set of labels and the second set of labels, and selecting an image of the at least one of the identified images corresponding to the shortest distance.

4. The method of claim 1, further comprising:
   generating a score for each of the identified images; and
   ranking the identified images based on the scores.

5. The method of claim 4, wherein each score is at least partially based on image quality and image aesthetics.

6. The method of claim 1, wherein providing the selected image for display comprises attaching the selected image to the captured text.

7. The method of claim 1, wherein the captured text is a menu item, the entity is a restaurant, and the identified images are images of a dish served at the restaurant corresponding to the menu item.

8. The method of claim 1, wherein parsing the captured text comprises optical character recognition.

9. The method of claim 1, wherein identifying the images corresponding to the parsed text and the entity comprises retrieving images from one or more websites associated with the entity.

10. A system for identifying images corresponding to text items, comprising:
    one or more memories;
    one or more processors in communication with the one or more memories, the one or more processors configured to:
    receive a captured image of captured text from an image capture device;
    parse the captured text in the captured image;
    determine a location of the image capture device at a time the captured image was captured;

determine a entity corresponding to the determined location;

identify images corresponding to the parsed text and the entity;

select at least one of the identified images by generating a first set of labels for the captured image based on the parsed text, generating a second set of labels for the identified images corresponding to the parsed text and the entity, and comparing the first set of labels to the second set of labels; and provide the selected image for display as an augmented reality overlay in relation to the captured text.

11. The system of claim 10, wherein comparing the first set of labels to the second set of labels comprises determining a distance between the first set of labels and the second set of labels.

12. The system of claim 11, wherein selecting the at least one of the identified images comprises identifying a shortest distance between the first set of labels and the second set of labels, and selecting an image of the at least one of the identified images corresponding to the shortest distance.

13. The system of claim 10, further comprising:
generating a score for each of the identified images; and
ranking the identified images based on the scores.

14. The system of claim 13, wherein each score is at least partially based on image quality and image aesthetics.

15. The system of claim 10, wherein providing the selected image for display comprises attaching the selected image to the captured text.

16. The system of claim 10, wherein the captured text is a menu item, the entity is a restaurant, and the identified images are images of a dish served at the restaurant corresponding to the menu item.

17. The system of claim 10, wherein the one or more processors reside on a client device.

18. A non-transitory computer-readable medium storing instructions executable by one or more processors for performing a method of identifying images corresponding to text items, the method comprising:

receiving a captured image of captured text from an image capture device;

parsing the captured text in the captured image;

determining a location of the image capture device at a time the captured image was captured;

determining a entity corresponding to the determined location;

identifying images corresponding to the parsed text and the entity;

selecting at least one of the identified images by generating a first set of labels for the captured image based on the parsed text, generating a second set of labels for the identified images corresponding to the parsed text and the entity, and comparing the first set of labels to the second set of labels; and providing the selected image for display as an augmented reality overlay in relation to the captured text.

\* \* \* \* \*